April 6, 1937.  A. G. H. STRAATMAN  2,076,211

APPARATUS FOR WELL SURVEYING

Filed Jan. 23, 1935

Inventor: Alphons Gerard Hubert Straatman

By his Attorney:

Patented Apr. 6, 1937

2,076,211

UNITED STATES PATENT OFFICE 2,076,211

APPARATUS FOR WELL SURVEYING

Alphons Gerard Hubert Straatman, The Hague, Netherlands, assignor to Shell Development Company, San Francisco, Calif., a corporation of Delaware Application January 23, 1935, Serial No. 3,193
In the Netherlands January 25, 1934

5 Claims. (Cl. 73—32)

This invention pertains to apparatus for determining the nature, thickness, dip and/or sequence of various geological strata by means of temperature measurements taken at various levels in a well traversing said strata.

It has been known to secure data on the geological formations by studying and measuring the outcrops of strata appearing on the surface, or by keeping an accurate record of the types of strata found at different depths in a number of wells drilled in the same field. In connection with similar investigations, the electrical properties of the strata have lately also been utilized.

It is the purpose of this invention to provide a new apparatus for obtaining data on thermal properties of subsurface strata. These properties may here be summed under the term of heat conductivity, which term, however, is not limited to the conception known in physics as the "heat conductivity coefficient", but embraces the whole complex of properties determining the rate at which a local temperature disturbance in a bore hole is neutralized by means of heat conducted to or from adjacent earth layers. This complex thus comprises not only the "conductivity coefficient", but also such properties as specific heat, specific density, particular composition, etc., of the various strata.

In practicing this invention, a disturbance is created in the temperature field surrounding a bore hole. This may be achieved, during normal drilling operations by means of the mudflush circulating in the borehole, or by filling the borehole with a liquid introduced for that purpose, such as water, petroleum, or a mixture of these liquids, said liquid or liquids differing in temperature from the surrounding strata. Since it is known that the temperature of the subsurface strata increases with the depth, the temperature of the liquid should preferably be selected so as to lie outside the whole range of temperature prevailing in the traversed strata, being kept above or, as has been found more practicable, below said range. This liquid should preferably be of a sufficiently high viscosity to prevent heat exchange through convection between vertical sections of the liquid column filling the well.

At the levels corresponding to the various strata, heat will now be conducted to or from these strata, so that the temperature of the liquid will gradually approach the temperature of the strata, this process taking place at a greater or lesser speed dependent on the temperature difference between the liquid and a given layer and on the heat conductivity of this layer. Owing to the difference in heat conductivity of the various layers, the curve obtained from temperature readings will show irregularities, since the temperature of the liquid at the level of a layer with a high heat conductivity will sooner approximate the final temperature than at the level of a layer with a low heat conductivity. Consequently, the irregularities in the temperature curve will supply information with regard to the heat conductivity and, therefore, to the nature of the various strata passed through. Particularly, if several wells have been drilled in the same field, conclusions may be drawn in regard to the dip of the strata by determining the level of corresponding irregularities in these wells, without having to consider the nature of the strata.

The differences in heat conductivity of the various strata would be expressed most distinctly, if it were possible to determine at any depth the difference between the temperature actually prevailing there, and the temperature which would prevail if all the strata had the same average heat conductivity. The latter temperatures would show a gradual rise from the surface to the bottom of the well, whilst the actual temperatures would deviate from the curve obtained to one or to the other side according to the higher or lower heat conductivities of the strata traversed. Although it is, of course, impossible to record or construct a temperature curve based on an "average heat conductivity of the strata", such a curve may be approximated by measuring the temperature of a thermally stable body, said body being lowered slowly, but at a uniform rate from the surface to the bottom of the well, or raised from its bottom to the surface. With such movement, the body, owing to its high heat capacity and/or its insulation, which may be provided, if desirable, will be unable to follow the smaller temperature fluctuations, but its temperature will gradually rise or drop as the depth to which it is moved increases or decreases. If the body is lowered into the well and at the beginning of the movement the temperature of the body is the same as that of the surroundings, then its temperature during the movement will always be slightly lower than the temperature according to the theoretical curve mentioned above. On the other hand, on the body being raised, its temperature will always slightly exceed that of the theoretical curve.

In order to determine the temperature at different levels variations of the fluid filling the borehole, I provide two temperature responsive means, one for the body being lowered into the borehole and the other for the fluid through which the body passes; in addition, automatic means are provided for registering the difference between the temperatures to which said temperature responsive means are simultaneously subjected. The heat responsive means are preferably provided in the form of thermo-couples as will be seen below.

A preferred form of apparatus suitable for the purposes of this invention will be better understood from the following description taken with reference to the appended drawing.

Figure 1:
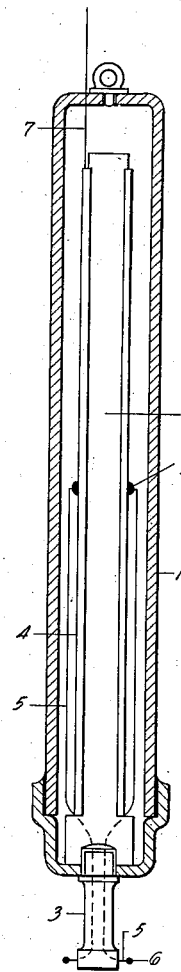
Figure 1 shows diagrammatically and partly in cross-section a view of the device to be lowered into the well.
Figure 2:
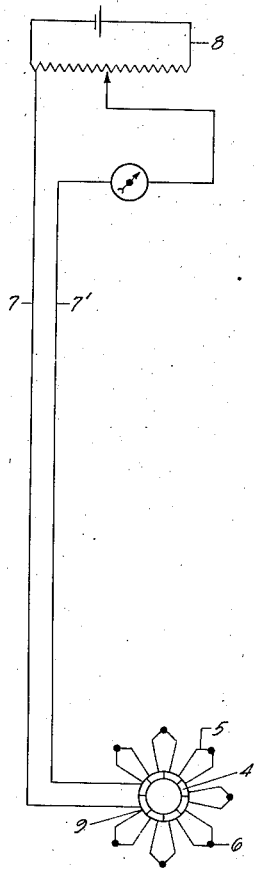
Figure 2 shows diagrammatically the connections of the thermo-couple and of the measuring equipment.

Referring to Fig. 1, a casing 1, adapted to be lowered into the well by means of a cable, contains a central columnar body 2 extending below the casing into a column 3. In the particular type of device represented in the drawing, the heat-containing body described above is embodied in a number of bars 4, placed around the columnar body 2, and made of a metal such as copper, bronze, iron, lead, etc., or of any other adequate material. It should, however, be understood that this invention is not limited to any particular shape or location of the parts 4, which may be varied at the will of the designer. The bars 4 are electrically insulated from each other and have a relatively high heat capacity. They are, moreover, protected by the casing 1 from a direct contact with the liquid of the well. The bars 4 are connected in series by wires 5 arranged in pairs and made of different materials to provide a thermo-couple effect, the junctions 6 of said wires being exposed to the temperature of the well, while the junctions 9 are, as obvious, at the temperature of the bars 4, which form the body of relatively large heat capacity referred to hereinbefore. The junctions 6 may be suitably protected from damage, but in such a manner as to allow them to acquire practically immediately the temperature of the surrounding liquid. The first and the last of the bars 4 connected in series as described to give a higher difference in potential are connected by conductors 7 and 7', respectively, to a potentiometer 8 at the surface. It is evident, that instead of a potentiometer, a galvanometer or any other electrical registering device may be used. It will be seen that the bars 4 thus form an effective part of the thermocouple.

From the above, it is clear that the method of this invention may be carried out in operation as follows:

As soon as the circulation of the mudflush is stopped and the liquid in the well comes to a standstill, this liquid will take or give off a certain quantity of heat from or to its surroundings, if a difference in temperature exists between them.

The amount of heat transferred depends on this temperature difference and on the heat conductivity of the strata at different levels. When the apparatus of Fig. 1 is slowly lowered into the well, the difference in temperature between the elements 4 and the well fluid at various levels corresponding to strata with different heat conductivities will be translated through the thermocouple effect, into differences of potential registered by potentiometer 8. By carefully recording the readings of the latter, it is possible to plot the temperature differences against the depth so that the curve obtained will give information as to the particular strata traversed by the well.

Furthermore, by comparing in some cases such a curve with similar curves obtained from other wells in the same field, it becomes possible to determine the general geological structure of the field and to establish correctly for example on what portion of an anticlinical structure the well is located.

I claim as my invention:

1. An apparatus for surveying subsurface strata traversed by a borehole comprising a metallic element of relatively large heat capacity capable of being lowered into a borehole and of following the general temperature trend of the borehole fluid, means associated with said element and responsive to a difference in temperature between said element and the well liquid surrounding said element, and means cooperating with said temperature responsive means adapted to register said temperature difference.

2. An apparatus for surveying subsurface strata traversed by a borehole comprising a metallic element capable of being lowered into the borehole and of following the general temperature trend of the borehole liquid, a thermocouple associated with said element and having one of its junctions at the temperature of said element and the other junction exposed to the liquid in the borehole, and means connected to said thermocouple for indicating the resulting voltage thereof.

3. The apparatus of claim 2 wherein the metallic element is made an effective part of the thermocouple.

4. An apparatus for surveying subsurface strata traversed by a borehole, comprising a metallic body of relatively large heat capacity capable of being lowered into the liquid filling a borehole and of following the general temperature trend of the borehole liquid, and consisting of several metal elements electrically insulated from each other, thermocouple connections between said elements forming two series of thermocouple junctions, one series being at the temperature of said body and the other at the temperature of the liquid in the borehole, and means connected with said thermocouple connections for indicating the resulting voltage thereof.

5. An apparatus for surveying subsurface strata traversed by a borehole comprising an element of relatively large heat capacity capable of being lowered into a borehole and of following the general temperature trend of the borehole fluid, means associated with said element and responsive to a difference in temperature between said element and the well liquid surrounding said element, and means cooperating with said temperature responsive means adapted to register said temperature difference.

ALPHONS GERARD

HUBERT STRAATMAN.